United States Patent
Horinouchi

(10) Patent No.: US 8,964,351 B2
(45) Date of Patent: Feb. 24, 2015

(54) ROBOTIC ARM

(71) Applicant: Panasonic Corporation, Osaka (JP)

(72) Inventor: Takashi Horinouchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 13/966,015

(22) Filed: Aug. 13, 2013

(65) Prior Publication Data

US 2013/0330162 A1    Dec. 12, 2013

Related U.S. Application Data

(63) Continuation of application No. PCT/JP2012/007565, filed on Nov. 26, 2012.

(30) Foreign Application Priority Data

Dec. 28, 2011    (JP) ................................. 2011-289687

(51) Int. Cl.
| | | |
|---|---|---|
| H01L 21/683 | (2006.01) | |
| B25J 17/00 | (2006.01) | |
| B25J 17/02 | (2006.01) | |
| B25J 18/00 | (2006.01) | |
| B25J 5/00 | (2006.01) | |
| B25J 9/04 | (2006.01) | |
| B25J 19/00 | (2006.01) | |
| B25J 15/00 | (2006.01) | |

(52) U.S. Cl.
CPC ..... *B25J 17/00* (2013.01); *B25J 5/007* (2013.01); *B25J 9/046* (2013.01); *B25J 19/0004* (2013.01); *B25J 15/0028* (2013.01); *Y10S 901/01* (2013.01); *Y10S 901/28* (2013.01); *Y10S 901/31* (2013.01)
USPC ............... 361/234; 74/490.05; 74/490.06; 901/1; 901/28; 901/31; 901/1

(58) Field of Classification Search
USPC ........... 361/234; 7/490.05, 490.06; 901/1, 28, 901/31; 74/490.05, 490.06
See application file for complete search history.

(56) References Cited

U.S. PATENT DOCUMENTS

| | | |
|---|---|---|
| 5,193,405 A | 3/1993 | Oomichi et al. |
| 7,551,419 B2 | 6/2009 | Pelrine et al. |
| 7,554,787 B2 | 6/2009 | Pelrine et al. |

(Continued)

FOREIGN PATENT DOCUMENTS

| | | |
|---|---|---|
| EP | 0081299 A2 | 6/1983 |
| JP | 61-146484 A | 7/1986 |

(Continued)

OTHER PUBLICATIONS

International Search Report issued in PCT/JP2012/007565, dated Feb. 26, 2013.

*Primary Examiner* — Scott Bauer
(74) *Attorney, Agent, or Firm* — McDermott Will & Emery LLP

(57) ABSTRACT

A robotic arm includes: an arm having one or more joints; an arm securing unit provided at at least one of the one or more joints and configured to secure, by electrostatic adhesion, a positional relationship between two parts coupled by each of the at least one of the one or more joints; and a control unit configured to turn on and off the electrostatic adhesion of the arm securing unit.

17 Claims, 15 Drawing Sheets

(56) References Cited

U.S. PATENT DOCUMENTS

| | | |
|---|---|---|
| 7,773,363 B2 | 8/2010 | Pelrine et al. |
| 7,872,850 B2 | 1/2011 | Pelrine et al. |
| 8,111,500 B2 | 2/2012 | Pelrine et al. |
| 8,125,758 B2 | 2/2012 | Pelrine et al. |
| 2010/0059298 A1* | 3/2010 | Pelrine et al. ............ 180/9 |
| 2010/0243344 A1* | 9/2010 | Wyrobek et al. .......... 180/21 |
| 2012/0120544 A1 | 5/2012 | Pelrine et al. |
| 2013/0010398 A1* | 1/2013 | Prahlad et al. ........... 361/234 |

FOREIGN PATENT DOCUMENTS

| | | |
|---|---|---|
| JP | 62-58182 U | 4/1987 |
| JP | 4-19787 U | 2/1992 |
| JP | 06-155368 A | 6/1994 |
| JP | 06-262580 A | 9/1994 |
| JP | 07-088784 A | 4/1995 |
| JP | 07-291471 A | 7/1995 |
| JP | 08-203800 A | 8/1996 |
| JP | 09-300260 A | 11/1997 |
| JP | 2005-246560 A | 9/2005 |
| JP | 2007-090493 A | 4/2007 |
| JP | 2007-276063 A | 10/2007 |
| JP | 4-130191 B2 | 8/2008 |
| JP | 2009-122666 A | 6/2009 |
| JP | 2009-540785 A | 11/2009 |
| JP | 2011-115918 A | 6/2011 |
| WO | 2008-070201 A2 | 6/2008 |

* cited by examiner

ROBOTIC ARM

CROSS REFERENCE TO RELATED APPLICATIONS

This is a continuation application of PCT International Application No. PCT/JP2012/007565 filed on Nov. 26, 2012, designating the United States of America, which is based on and claims priority of Japanese Patent Application No. 2011-289687 filed on Dec. 28, 2011. The entire disclosures of the above-identified applications, including the specifications, drawings and claims are incorporated herein by reference in their entirety.

FIELD

The present disclosure relates to robotic arms for household use.

BACKGROUND

Robots have been researched and developed extensively in recent years. Robots, such as those capable of entering and performing tasks in areas that are potentially dangerous for people, and those designed to assist and care for the elderly, for example, have received a great amount of attention.

Modern homes are often equipped with hand rails or lifts to make them more accessible for elderly persons, for example. While lifts are capable of assisting a user to sit or stand or move from one place to another in rooms such as bathrooms and bedrooms, a user's interaction with such lifts is limited since the configuration and installation location cannot easily be changed. It is for this reason that robots and apparatuses have been proposed which give elderly persons more independence by assisting them to sit or stand or move from one place to another.

One such known robot transports objects and includes a multi-jointed arm capable of lifting objects (for example, see Patent Literature (PTL) 1).

With the robot provided with a multi-jointed arm disclosed in PTL 1, the joints are controlled to secure and prevent the joints from moving when the arm of the robot lifts an object and holds the object in place. A common technique is to keep the motors from moving and secure the joints by applying voltage to the motors which drive the joints.

CITATION LIST

Patent Literature

[PTL 1] Japanese Unexamined Patent Application Publication No. 2007-276063
[PTL 2] Japanese Unexamined Patent Application Publication No. 2009-540785

SUMMARY

Technical Problem

However, this method of securing each of the joints provided on the arm of the robot is problematic in that it requires a large amount of power.

The present disclosure has been conceived with the intent of solving the above problem and aims to provide a robot that includes an arm capable of securing the joints thereon with low power consumption, and is capable of assisting a user to sit and stand.

Solution to Problem

In order to solve the above problem, a robotic arm according to an aspect of the present disclosure includes: an arm having one or more joints; an arm securing unit provided at at least one of the one or more joints and configured to secure, by electrostatic adhesion, a positional relationship between two parts coupled by each of the at least one of the one or more joints; and a control unit configured to turn on and off the electrostatic adhesion of the arm securing unit.

Moreover, the arm securing unit of the robotic arm according to an aspect of the present disclosure is configured to electrostatically adhere together the two parts coupled by each of the at least one of the one or more joints of the arm, to secure the positional relationship between the two parts.

With this, a low power consumption robotic arm is achievable by using electrostatic adhesion to secure a joint provided on the arm.

Moreover, each of the one or more joints of the arm of the robotic arm according to an aspect of the present disclosure is provided with the arm securing unit.

With this, it is possible to further reduce the power consumption of the robotic arm by securing all of the joints provided on the arm by electrostatic adhesion.

Moreover, the robotic arm according to an aspect of the present disclosure further includes: a hand having one or more joints and coupled to the arm by at least one of the one or more joints of the arm, the hand being for grasping an object; and a hand securing unit provided at at least one of the one or more joints of the hand and configured to secure, by electrostatic adhesion, a positional relationship between two parts coupled by each of the at least one of the one or more joints of the hand, wherein the control unit is further configured to turn on and off the electrostatic adhesion of the hand securing unit.

Moreover, the hand securing unit of the robotic arm according to an aspect of the present disclosure is configured to electrostatically adhere together the two parts coupled by each of the at least one of the one or more joints of the hand, to secure the positional relationship between the two parts.

With this, an even less power-consuming robotic arm is achievable by using electrostatic adhesion to secure the joints provided on the hand.

Moreover, the robotic arm according to an aspect of the present disclosure further includes a base coupled to the arm by at least one of the one or more joints of the arm.

Moreover, the robotic arm according to an aspect of the present disclosure further includes a base securing unit attached to the base and configured to secure the base in place by electrostatic adhesion to a surface of a structure external to the robotic arm, wherein the control unit is further configured to turn on and off the electrostatic adhesion of the base securing unit.

Moreover, the base of the robotic arm according to an aspect of the present disclosure includes a storage space for storing the arm.

Advantageous Effects

With the present disclosure, a robotic arm is achievable that has an arm capable of securing joints provided thereon in place with low power consumption.

BRIEF DESCRIPTION OF DRAWINGS

These and other objects, advantages, and features will become apparent from the following description thereof taken in conjunction with the accompanying Drawings, by way of non-limiting examples of an embodiment of the present disclosure.

DESCRIPTION OF EMBODIMENT

Hereinafter, a non-limiting embodiment according to the present disclosure will be described with reference to the Drawings.

It is to be noted that the non-limiting embodiment described below shows a comprehensive or specific example. The numerical values, shapes, materials, structural elements, the arrangement and connection of the structural elements, steps, the processing order of the steps etc. shown in the following non-limiting, exemplary embodiment are mere examples, and therefore do not limit the present disclosure. Among the structural elements in the following non-limiting, exemplary embodiment, structural elements not recited in any one of the independent claims defining the most generic part of the inventive concept are described as arbitrary structural elements of the non-limiting embodiment.

First, the robotic arm according to this non-limiting embodiment will be described using FIG. 1 and FIG. 2.

Figure 1:
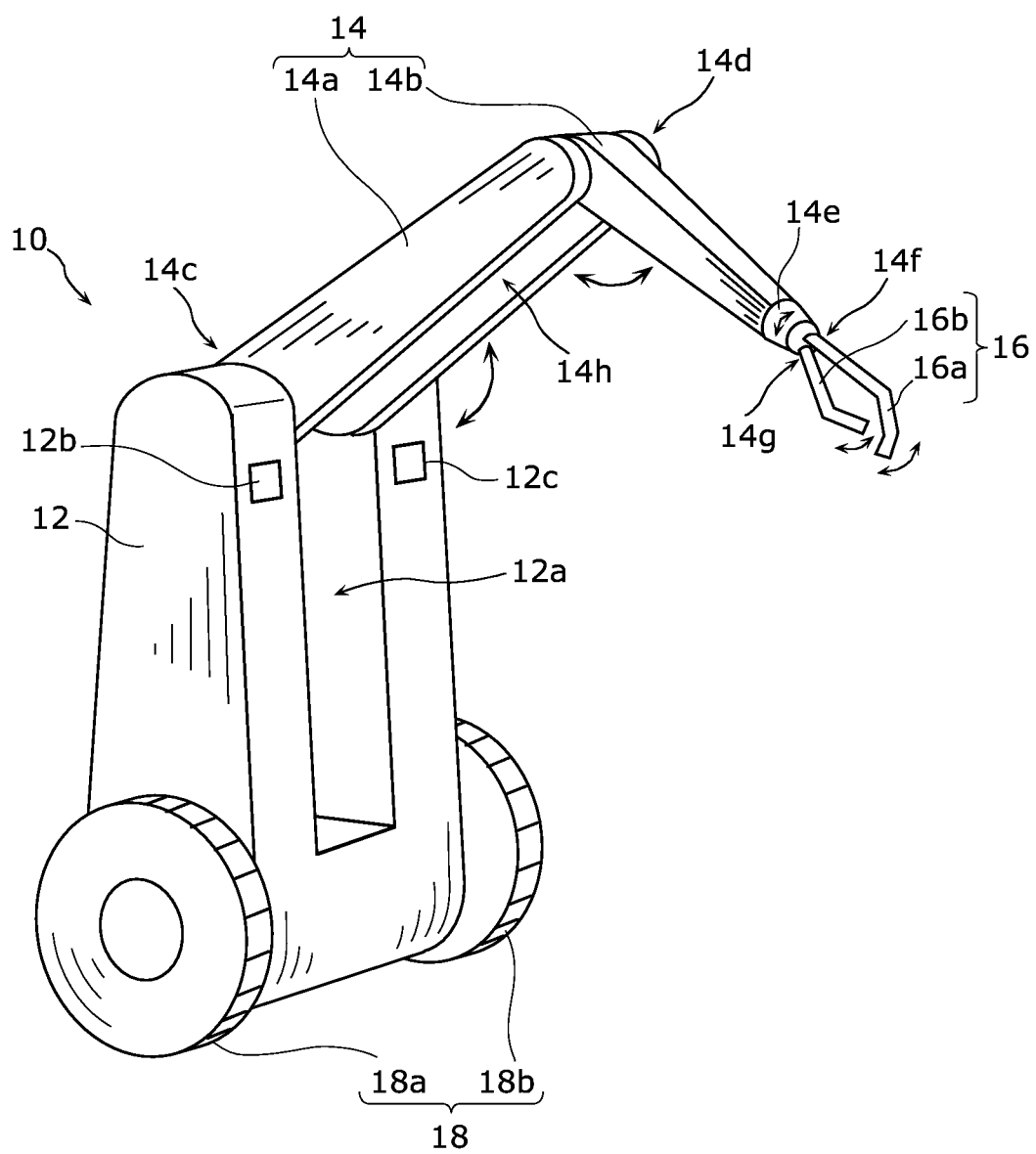
FIG. 1 is a view of the front of the robotic arm according to a non-limiting embodiment.

FIG. 1 is a view of the front of the robotic arm 10 according to a non-limiting embodiment.

Figure 2:
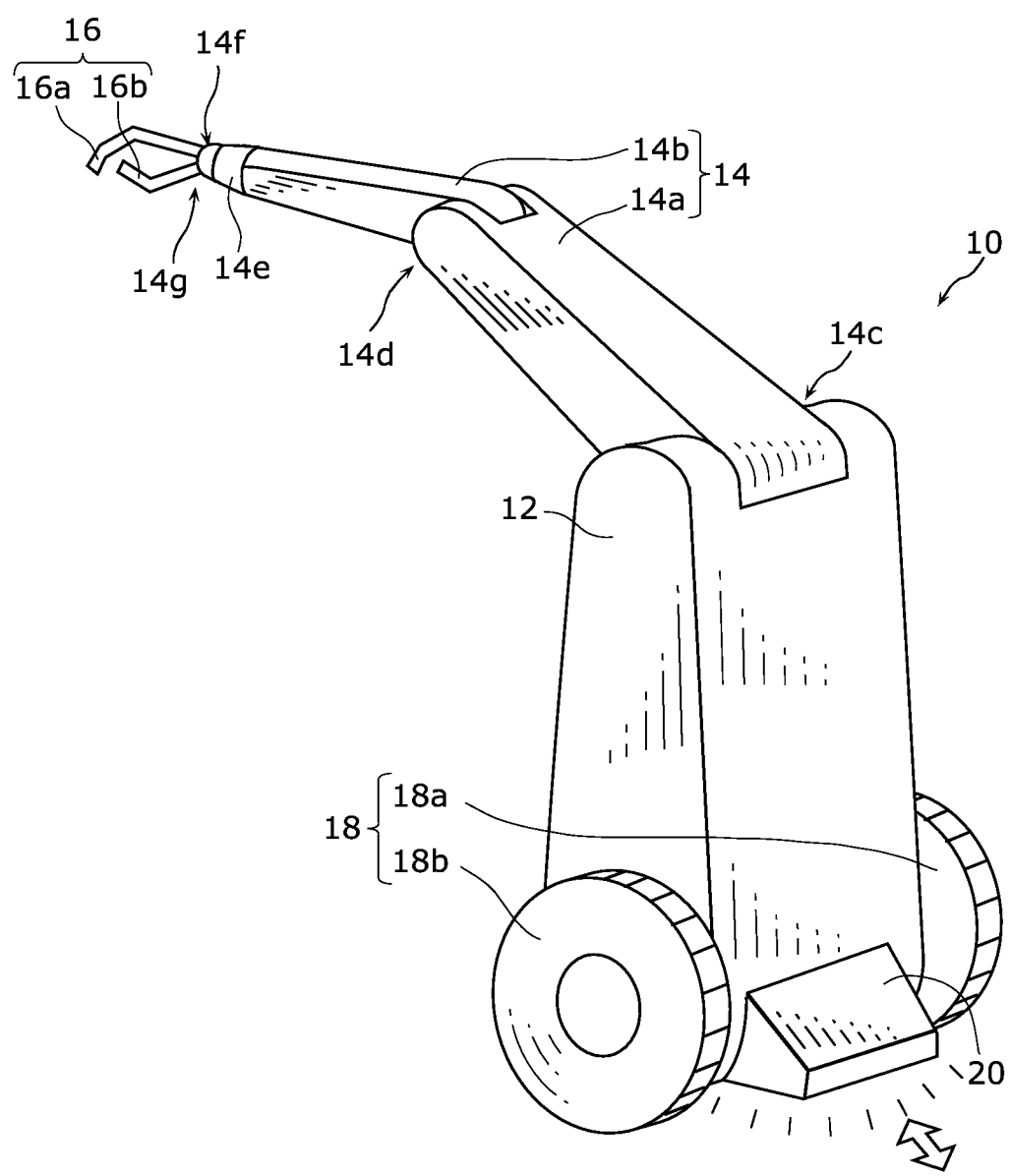
FIG. 2 is a view of the back of the robotic arm according to a non-limiting embodiment.

FIG. 2 is a view of the back of the robotic arm 10 according to a non-limiting embodiment.

Figure 3:
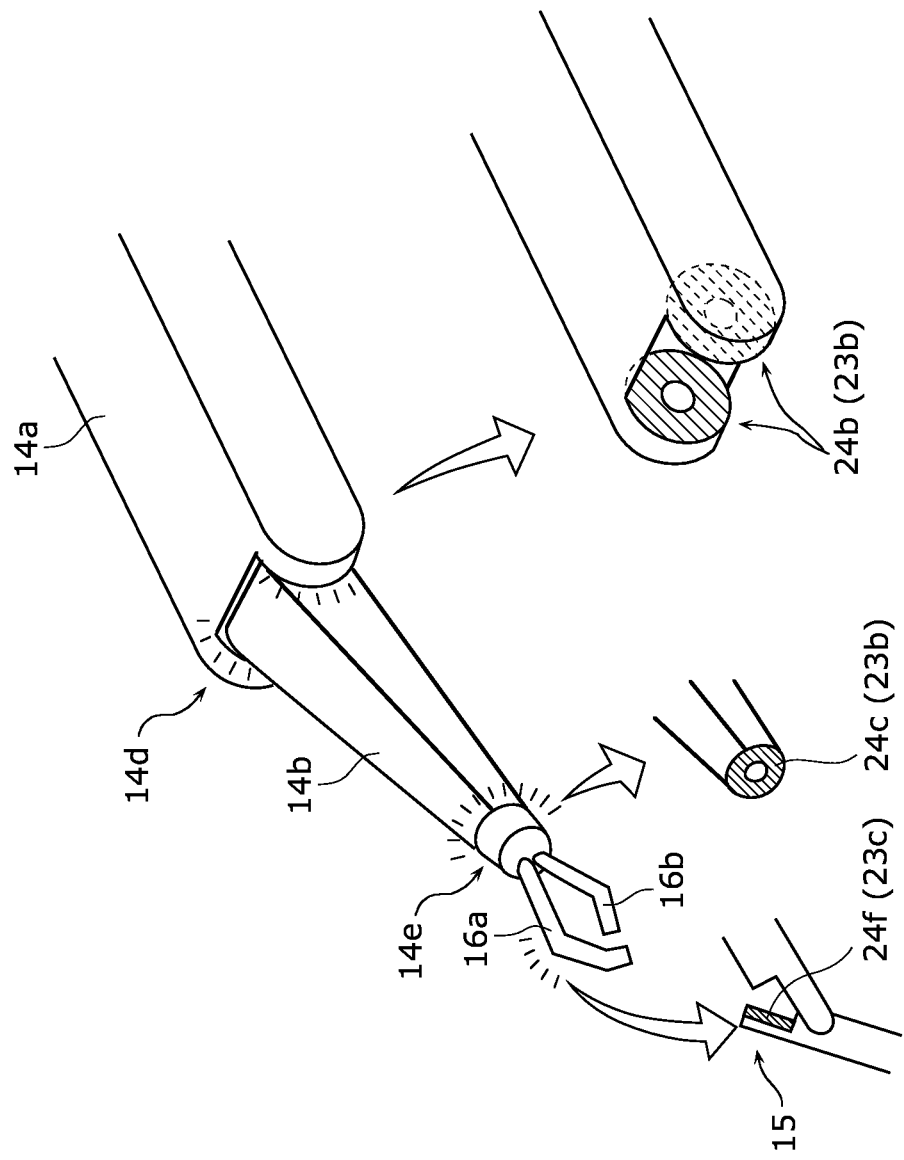
FIG. 3 is a view showing an arm securing unit and a hand securing unit.

FIG. 3 is a view showing the arm securing unit and the hand securing unit.

As FIG. 1 and FIG. 2 show, the robotic arm 10 includes a base 12 which propels itself on a travel surface, an arm 14, a hand 16 which grasps an object, and a base securing unit 20.

It should be noted that self propulsion refers to the robotic arm 10 traveling without assistance from any object other than the robotic arm 10. Self propulsion includes the robotic arm 10 traveling as a result of a user operating the robotic arm 10 via a wired or wireless connection.

Moreover, as FIG. 3 shows, the joints of the arm 14 are provided with an arm securing unit 23b, and the joint of the hand 16 is provided with a hand securing unit 23c.

The robotic arm 10 according to this non-limiting embodiment is a household-use robot designed to be used mainly for household (inside a building) purposes, and is a self-propelled robot which performs a task involving an object located in front of the robot. It should be noted that the robotic arm 10 is operated via remote control by a user.

The base 12 which propels itself on a travel surface is the main body of the robotic arm 10 and is designed to be light weight, compact, and storable in spaces between consumer electronics or furniture, for example.

The base 12 has six surfaces, each surface being trapezoidal or rectangular in shape (in other words, the base 12 is a substantially rectangular solid). Each surface is a flat plane except for the upper surface (a surface on the side on which the arm 14 is coupled), which is rounded. The base 12 has a shape similar to commercially available household vacuum cleaners.

Resin is typically used as the material for the base 12, but usable materials are not limited thereto. For example, a lightweight metal may be used. Moreover, as will be described later, the base 12 includes a storage space 12a for storing the arm 14 and the hand 16, allowing the arm 14 to be folded and stored in the base 12. The storage space 12a is capable of storing a forearm 14b and the hand 16 while they are folded in an upper arm cavity 14h.

The base 12 includes, on the front surface thereof, an imaging unit 12b and a distance measuring unit 12c.

The imaging unit 12b captures an image of the travel surface on which the robotic arm 10 propels itself, and is, for example, a CMOS camera. Moreover, the imaging unit 12b is capable of adjusting the image capturing direction. As such, the imaging unit 12b is capable of capturing an image of what is in front of the robotic arm 10 as well. It should be noted that the imaging unit 12b may use a charge coupled device (CCD). Moreover, by providing the imaging unit 12b with a lighting device such as a light emitting diode (LED), the imaging unit 12b becomes capable of capturing a clear image even when the area surrounding the robotic arm 10 is dark.

The distance measuring unit 12c measures the distance between the robotic arm 10 and an object located in front of the robotic arm 10, and is, for example, an ultrasonic sensor. It should be noted that the distance measuring unit 12c may be a displacement sensor or the like which uses an infrared laser. Moreover, when the robotic arm is to be mainly used outdoors, the distance measuring unit 12c may further be configured to include a global positioning system (GPS).

Wheels 18 (a right wheel 18a and a left wheel 18b) are provided toward the bottom of the base 12. The right wheel 18a is positioned toward the bottom of the right side of the base 12, and the left wheel 18b is positioned toward the bottom of the left side of the base 12. The right wheel 18a and the left wheel 18b are both circular and have the same diameter, and are provided with non-slip grooves on the contact surfaces thereof. Resin is typically used as the material for the right wheel 18a and the left wheel 18b, but usable materials are not limited thereto.

The robotic arm 10 travels by a driving unit installed in the base 12 rotating the wheels 18. The robotic arm 10 travels while the end of the base 12 on which a first joint is provided is on top and the end of the base 12 on which the wheels 18 are provided is on bottom, as FIG. 1 shows.

While traveling in this state, the robotic arm 10 adjusts the rotation of the wheels 18 to maintain the stability of the center of gravity of the robotic arm. This allows the robotic arm 10 to travel in a stable manner without falling over despite the use of only two wheels.

It should be noted that in the examples shown in FIG. 1 and FIG. 2, the robotic arm 10 is configured having two wheels—the right wheel 18a and the left wheel 18b—but the robotic arm 10 may be configured to have three or more wheels.

Moreover, the robotic arm 10 is not limited to wheels as a means for travel. For example, the robotic arm 10 may be provided with caterpillar tracks for traveling. The robotic arm 10 may also be provided with legs and configured to walk, for example.

The arm 14 attached to the top of the base 12 is a multi-jointed arm configured of an upper arm 14a, the forearm 14b, and a plurality of joints (the first joint 14c through fifth joint 14g). The joints on the arm 14 include a joint that couples the base 12 and the arm 14, a joint that couples the upper arm 14a and the forearm 14b that make up the arm 14, and a joint that couples the arm 14 and the hand 16.

Moreover, the hand 16 is coupled to the leading end of the arm 14. The robotic arm 10 performs a task involving an object positioned in front of it by moving the arm 14 and the hand 16.

The forearm 14b of the arm 14 is a long, thin structure having six surfaces. Assuming the length of the six sided structure to be the vertical direction, the four side surfaces of the six sided structure are long in height relative to the length of the top and bottom, and are substantially the same trapezoidal shape. Assuming the length of the six sided structure to be the vertical direction, the top and bottom surfaces are substantially rectangular in shape.

Resin is typically used as the material for the arm 14, but usable materials are not limited thereto. For example, a lightweight metal may be used. It should be noted that the arm 14 and the hand 16 are storable in the base 12. Storage of the arm 14 and the hand 16 will be described later.

One end of the upper arm 14a is coupled to the base 12 via the first joint 14c. In other words, the first joint is a joint which couples the base 12 and the arm 14. As such, the arm 14 is bendable at the first joint 14c.

The other end of the upper arm 14a is coupled to one end of the forearm 14b via the second joint 14d. In other words, the second joint is a joint which couples the upper arm 14a and the forearm 14b that make up the arm 14. As such, the arm 14 is bendable at the second joint 14d.

It should be noted that the moveable range (the range of bendability) of the arm 14 in the front of the robotic arm 10 shown in FIG. 1 is wide and ability to bend is free. On the other hand, the moveable range of the arm 14 behind the robotic arm 10 shown in FIG. 2 is narrow and ability to bend is limited.

The third joint 14e, the fourth joint 14f, and the fifth joint 14g are joints that couple the arm 14 and the hand 16.

The third joint 14e is coupled to the other end of the forearm 14b. The third joint 14e rotates in the direction of the arrows in FIG. 1 This allows the hand 16 coupled to the third joint 14e to rotate and grasp objects in a variety of directions.

As described above, the joints provided on the arm 14 include a joint that couples the base 12 and the arm 14 (the first joint 14c), a joint that couples a plurality of arm parts making up the arm 14 (the second joint 14d), and joints that couple the arm 14 and the hand 16 (the third joint 14e, the fourth joint 14f, and the fifth joint 14g).

The hand 16 is a member which is attached to the arm 14 and is capable of grasping an object. The hand 16 is configured of a long finger 16a and a short finger 16b.

The long finger 16a is coupled to the hand 16 via the fourth joint 14f, and the short finger 16b is coupled to the hand 16 via the fifth joint 14g. As such, the long finger 16a is bendable at the fourth joint 14f and the short finger 16b is bendable at the fifth joint 14g.

This allows the robotic arm 10 to grasp an object with the long finger 16a and the short finger 16b (the hand 16).

It should be noted that the hand 16 may adhere to an object using an electrostatic adhesion unit (to be described later), an electromagnet, or a pump. In other words, the hand 16 is not limited to a configuration which includes the long finger 16a and the short finger 16b. The configuration of the hand 16 may be any configuration as long as the hand 16 is capable of grasping an object.

Moreover, the long finger 16a includes a joint (the sixth joint) about which it is capable of bending.

The upper arm 14a is provided with an upper arm cavity 14h. The upper arm cavity 14h functions as a storage space for the forearm 14b, the third joint 14e, the fourth joint 14f, the fifth joint 14g, and the hand 16 for when the arm 14 is to be folded and stored in the base 12.

It should be noted that the robotic arm 10 may be provided with a plurality of arms 14.

The base securing unit 20 is attached to the bottom (bottom surface) of the base 12. The electrostatic adhesion unit included in the base securing unit 20 secures the base 12 in place by electrostatically adhering to a surface of a structure external to the robotic arm 10. The surface of the structure is, for example, a surface of a floor or a surface of a refrigerator chassis (to be described later). In this non-limiting embodiment, the base securing unit 20 is attached to the lower portion of the back surface of the robotic arm 10, but the position is not limited thereto.

Here, securing the base 12 means securely fixing the base 12 in place to keep forces applied to the base 12 from hindering the robotic arm 10 from performing a given task. For example, when the robotic arm 10 attempts to lift a heavy object with the arm 14 and a load is applied away from the center of gravity of the base 12, securing the base 12 means making sure the base is stable and does not move (fall over) so that the arm 14 is capable of lifting the heavy object. Moreover, electrostatic adhesion means mechanically bonding two objects using electrostatic energy, and means substantially the same thing as electrostatic absorption.

An electrostatic adhesion apparatus such as the one disclosed in PTL 2 (Japanese Unexamined Patent Application Publication No. 2009-540785), for example, is used in the base securing unit 20. With the electrostatic adhesion apparatus disclosed in PTL 2, it is possible to secure and free the base 12 with electrostatic adhesion by turning the application of voltage on and off, respectively. It should be noted that the electrostatic adhesion apparatus disclosed in PTL 2 is capable of supporting a load of approximately 100 g when the adhesion surface area with respect to the structure is 1 cm2 and a load of approximately 8 kg when the adhesion surface area with respect to the structure is 100 cm2.

In this way, by using the base securing unit 20 having an electrostatic adhesion unit for securing the base 12 in place, it is possible to secure the base 12 in place with electrostatic energy. A robotic arm 10 that is light weight and compact can be achieved when this kind of structure is used for the base securing unit 20 since there is no need to add mechanisms, electromagnets, or pumps, for example, for securing the base 12 in place.

Moreover, when the robotic arm 10 is used indoors, the surface of the structure to which the base securing unit 20 electrostatically adheres is a surface of a floor of the building, a surface of a wall of the building, or a surface of an object installed inside the building.

The base securing unit 20 is capable of electrostatically adhering to structures of various materials and securing the robotic arm 10 in place. Moreover, for example, by making the electrostatic adhesion unit, which is the surface of the base securing unit 20 which adheres to a structure, a caterpillar track, the base securing unit 20 is capable of securing the base 12 in place even on uneven surfaces. In other words, the robotic arm 10 is capable of securing the base with the base securing unit 20 appropriately according to the place of use.

Moreover, the base securing unit 20 is retractable from and storable in the base 12. As such, the height of the electrostatic adhesion unit of the base securing unit 20 is higher than the height of the contact surface of the wheels 18 while the robotic arm 10 is traveling. In other words, the base securing unit 20 does not hinder the traveling ability of the robotic arm 10.

Next, the arm securing unit 23b and the hand securing unit 23c will be described in detail using FIG. 3.

FIG. 3 is a view showing the arm securing unit 23b and the hand securing unit 23c.

The arm securing unit 23b and the hand securing unit 23c each secure the positional relationship between two parts coupled by a joint by electrostatically adhering the two parts together.

The second joint 14d that couples the upper arm 14a and the forearm 14b is provided with an arm electrostatic adhesion unit 24b as the arm securing unit 23b. As FIG. 3 shows, in this non-limiting embodiment, the arm electrostatic adhesion unit 24b is provided on each of the two surfaces of the upper arm 14a which come in contact with the forearm 14b. However, the arm electrostatic adhesion unit 24b may be provided on the forearm 14b.

It should be noted that it is not necessary to provide both the upper arm 14a and the forearm 14b with the arm electrostatic adhesion unit 24b. The arm electrostatic adhesion unit 24b may be provided on either one of the two parts coupled by the joint.

The arm electrostatic adhesion unit 24b has the structure of a round sheet.

Similarly, the third joint 14e that couples the forearm 14b and the hand 16 is provided with an arm electrostatic adhesion unit 24c as the arm securing unit 23b. As FIG. 3 shows, in this non-limiting embodiment, the arm electrostatic adhesion unit 24c provided at the third joint 14e is provided on the surface of the forearm 14b that comes in contact with the hand 16, but may be provided on the hand 16 instead.

The arm electrostatic adhesion unit 24c has the form of a round sheet.

The long finger 16a includes a sixth joint 15 in the center thereof, and a hand electrostatic adhesion unit 24f is provided at the sixth joint 15 on the side of the leading end of the long finger 16a as the hand securing unit 23c. The hand electrostatic adhesion unit 24f may be provided on the arm 14 at the sixth joint 15. It is not necessary to provide both the leading end part of the long finger 16a and the non-leading end part of the long finger 16a nearest the hand with the hand electrostatic adhesion unit 24f. The hand electrostatic adhesion unit 24f may be provided on either one of the two parts coupled by the joint.

Although not shown in the Drawings, it is to be noted that an arm electrostatic adhesion unit 24a is provided at the first joint 14c as the arm securing unit 23b. Moreover, a hand electrostatic adhesion unit 24d is provided at the fourth joint 14f as the hand securing unit 23c, and a hand electrostatic adhesion unit 24e is provided at the fifth joint 14g as the hand securing unit 23c. In other words, all joints provided on the arm 14 and hand 16 include an arm securing unit 23b.

It should be noted that the arm electrostatic adhesion units 24a through 24c and the hand electrostatic adhesion units 24d through 24f are configured to adhere the corresponding parts together only when securing the arm 14 and the hand 16 is necessary. As such, when the arm 14 is being driven, the arm electrostatic adhesion units 24a through 24c do not interfere with the driving of the arm 14. Similarly, when the hand 16 is being driven, the hand electrostatic adhesion units 24d through 24f do not interfere with the driving of the hand 16.

Next, the state of the arm 10 while it is storing the arm 14 and the base securing unit 20 in the base 12 will be described.

Figure 4:
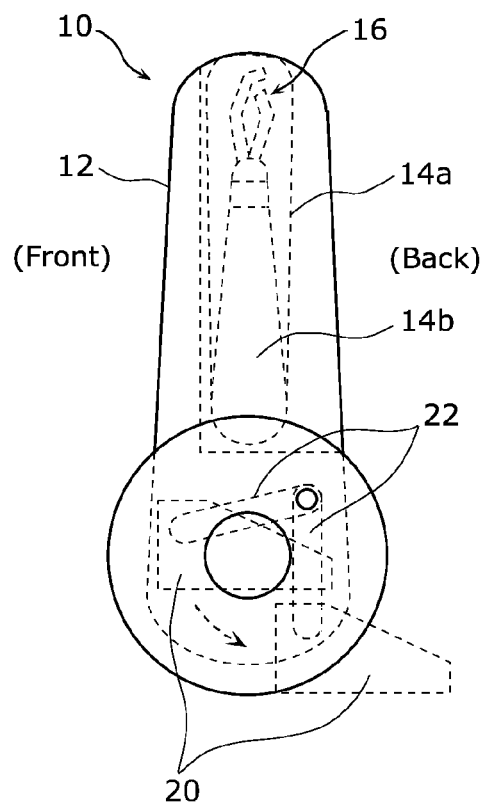
FIG. 4 is a view of the side of the robotic arm while the arm is being stored.
Figure 5:
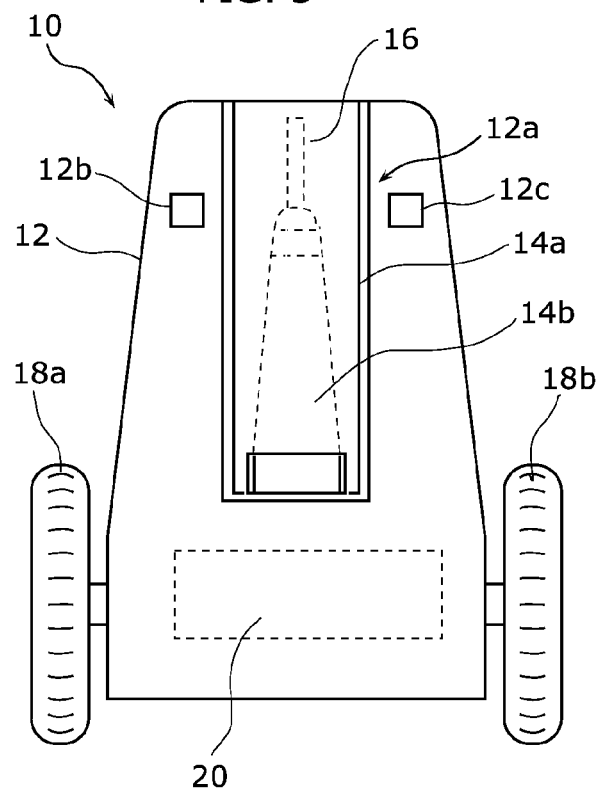
FIG. 5 is a view of the front of the robotic arm while the arm is being stored.
Figure 6:
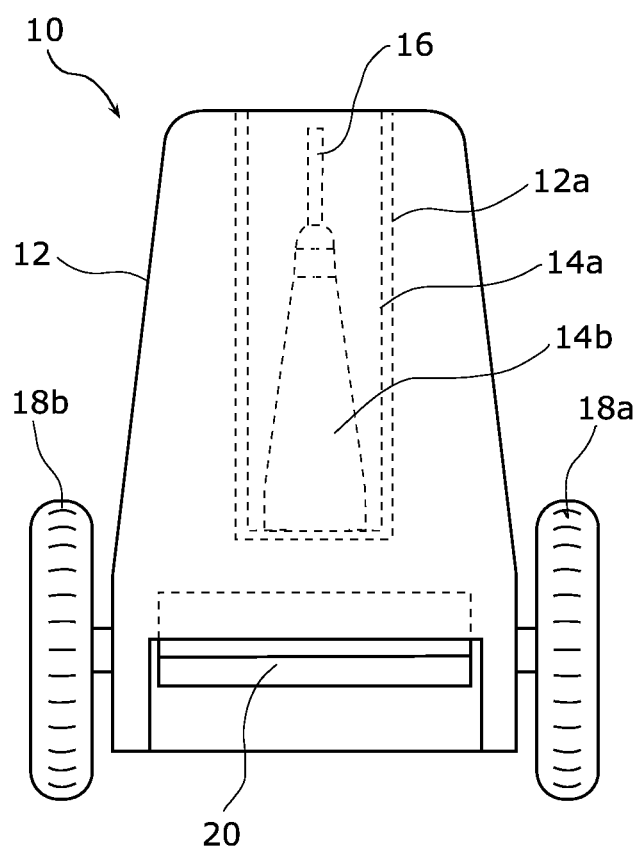
FIG. 6 is a view of the back of the robotic arm while the arm is being stored.

FIG. 4, FIG. 5 and FIG. 6 are views of the side, front, and back of the robotic arm 10, respectively, while the arm 14 is being stored.

The forearm 14b and the hand 16 are stored in the upper arm cavity 14h provided in the upper arm 14a with use of the second joint 14d. For this reason, the vertical length of the upper arm cavity 14h is longer than the overall length of the forearm 14b and the hand 16.

The upper arm 14a stores the forearm 14b and the hand 16 in the upper arm cavity 14h, and the upper arm 14a is then stored in the storage space 12a provided in the base 12 with the use of the first joint 14c.

As FIG. 5 shows, when the robotic arm 10 is viewed from the front while the robotic arm 10 is storing the arm 14, the arm 14 is folded and stored so as to be one with the base 12.

The base securing unit 20 includes a foldable lever 22 which folds to store the base securing unit 20. The lever 22 and the base securing unit 20 are configured in such a way so as not to interfere with the rotary shaft of the right wheel 18a and the left wheel 18b.

As FIG. 6 shows, when the robotic arm 10 is viewed from the back while the robotic arm 10 is storing the base securing unit 20, the height of the adhesive surface of the base securing unit 20 is higher than the contact surface of the wheels 18.

By storing the arm 14 and the base securing unit 20 in the base 12 in the manner described above, an even more compact robotic arm 10 is achievable.

Next, the system configuration of the robotic arm 10 will be described.

Figure 7:
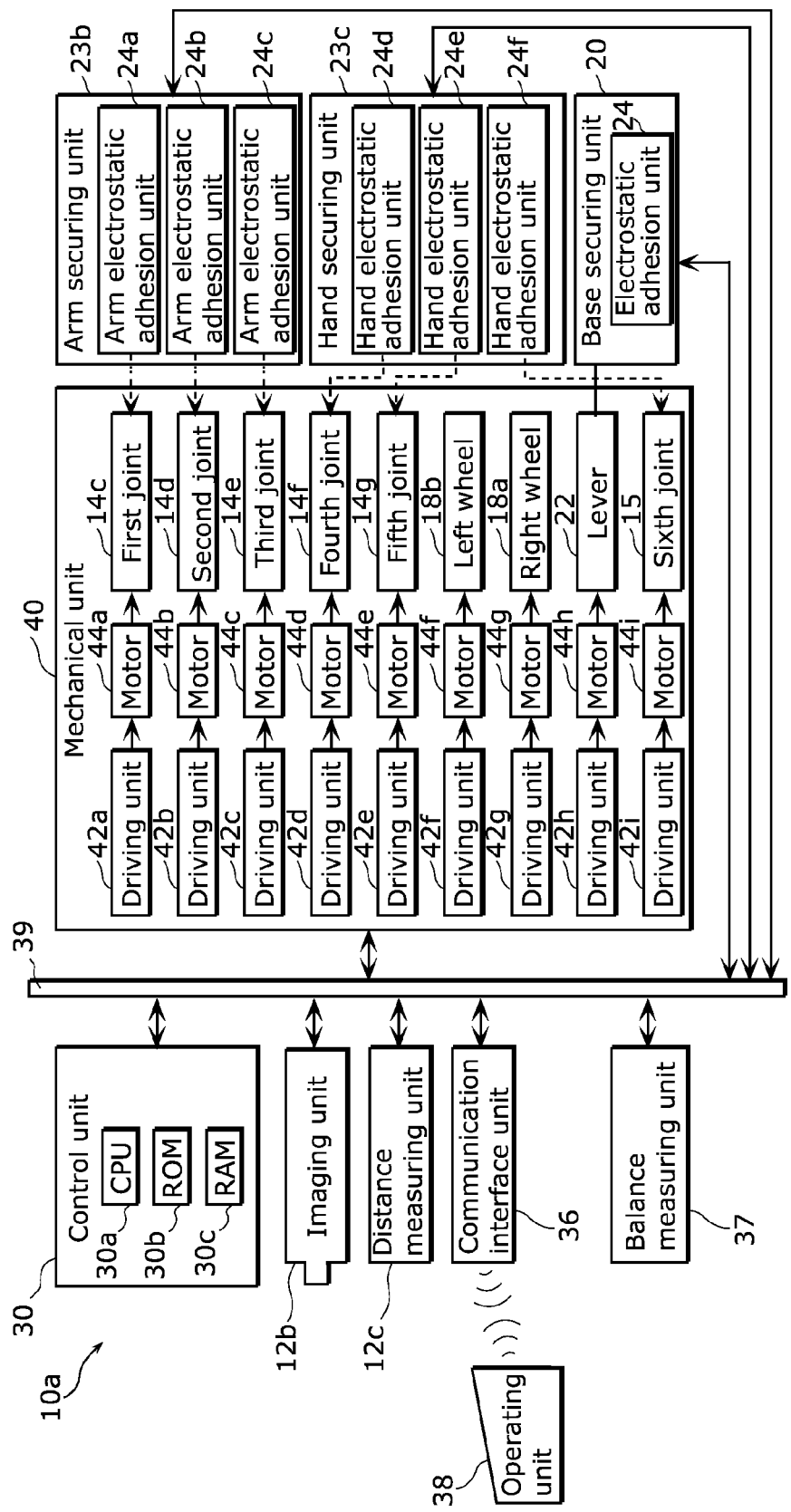
FIG. 7 is a block diagram showing the system configuration of the robotic arm according to a non-limiting embodiment.

FIG. 7 is a block diagram showing the system configuration of the robotic arm according to a non-limiting embodiment.

The robotic arm 10 includes, in the base 12, a control unit 30, the imaging unit 12b, the distance measuring unit 12c, a communication interface unit 36, a mechanical unit 40, the base securing unit 20, a balance measuring unit 37, the arm securing unit 23b, and the hand securing unit 23c.

The control unit 30 is a computer system configured from a CPU 30a, a ROM 30b, a RAM 30c.

The CPU 30a is, for example, a processor which executes a control program stored in the ROM 30b.

The ROM 30b is a read only memory that holds the control program and the like.

The RAM 30c is a volatile memory area and a readable memory used as a work area to be used when the CPU 30a executes the control program. Moreover, the RAM 30c temporarily holds images and the like captured by the imaging unit 12b.

The control unit 30 receives, via a bus 39, a command (signal) received by the communication interface unit 36 from an operating unit 38, and based on this command, controls the imaging unit 12b, the distance measuring unit 12c, the balance measuring unit 37, the mechanical unit 40, the base securing unit 20, the arm securing unit 23b, and the hand securing unit 23c.

On the basis of the control by the control unit 30, the imaging unit 12b captures an image by video of the travel surface on which the robotic arm 10 propels itself.

On the basis of the control by the control unit 30, the distance measuring unit 12c measures the distance between the robotic arm 10 and an object located in front of the robotic arm 10.

The communication interface unit 36 receives commands from the operating unit 38 and transmits the commands to the control unit 30 via the bus 39. The communication interface unit 36 receives commands from the operating unit 38 via wireless data communication. Wireless data communication is, for example, communication by a wireless LAN or infrared communication.

The balance measuring unit 37 measures the weight balance of the robotic arm 10. The balance measuring unit 37 is, for example, a gyro sensor or an acceleration sensor.

The operating unit 38 is a dedicated terminal with a liquid crystal display that is capable of remotely controlling the robotic arm 10. The liquid crystal display of the operating unit 38 includes a touch panel which detects touch controls (commands) made by the user to the operating unit 38. Moreover, the liquid crystal display of the operating unit 38 is capable of displaying images captured by the imaging unit 12b.

The operating unit 38, for example, transmits commands input by the user at the operating unit 38 to the communication interface unit 36 via wireless communication.

It should be noted that the operating unit 38 may be a commercially available hand-held or tablet device. In other words, the robotic arm 10 may be controlled using a commercially available hand-held or tablet device.

Moreover, the operating unit 38 may be provided with a speech obtaining unit (microphone) in which case the robotic arm 10 may be configured to operate according to voice commands made by the user.

The mechanical unit 40 includes the first joint 14c through the fifth joint 14g, the sixth joint 15, the right wheel 18a, the left wheel 18b, the lever 22, motors 44a through 44i, and driving units 42a through 42i.

the first joint 14c through the fifth joint 14g, the right wheel 18a, the left wheel 18b, and the lever 22 are each associated with a corresponding one of the motors 44a through 44i and a corresponding one of the driving units 42a through 42i which drive the motors. For example, the driving unit 42a corresponds to and drives the motor 44a which is coupled to and moves the first joint 14c. Similarly, for example, the driving unit 42h corresponds to and drives the motor 44h which is coupled to and moves the lever 22.

On the basis of the controls by the control unit 30, the driving units 42a through 42e move the first joint 14c through the fifth joint 14g by driving the corresponding motors 44a through 44e. On the basis of the controls by the control unit 30, the driving unit 42i moves the sixth joint 15 by driving the corresponding motor 44i.

Moreover, on the basis of controls by the control unit 30, the driving units 42f and 42g rotate the left wheel 18b and the right wheel 18a by driving the corresponding motors 44f and 44g. During this time, according to the output of the balance measuring unit 37, the control unit 30 controls the rotation of the wheels 18 in a manner so as to prevent the robotic arm 10 from falling over. More specifically, the control unit 30 controls the weight balance of the robotic arm 10 by individually controlling the rotational speed and rotational direction of the right wheel 18a and the left wheel 18b based on the changes in weight balance of the robotic arm 10 measured by the balance measuring unit 37.

Moreover, on the basis of the control by the control unit 30, the driving unit 42h moves the lever 22 (base securing unit 20) by driving the corresponding motor 44h. In other words, the control unit 30 controls the retracting of the base 12 into and from the base securing unit 20.

The base securing unit 20 includes an electrostatic adhesion unit 24. On the basis of the control by the control unit 30, the electrostatic adhesion unit 24 secures the base 12 in place by electrostatically adhering to a surface of a structure. In other words, the control unit 30 controls the turning of the electrostatic adhesion of the base securing unit 20 on and off.

The arm securing unit 23b includes arm electrostatic adhesion units 24a, 24b, and 24c. On the basis of the control by the control unit 30, the arm electrostatic adhesion units 24a, 24b, and 24c individually secure the first joint 14c, the second joint 14d, and the third joint 14e using electrostatic adhesion. It should be noted that the control unit 30 is capable of individually turning the electrostatic adhesion by the arm electrostatic adhesion units 24a, 24b, and 24c on and off.

The hand securing unit 23c includes hand electrostatic adhesion units 24d, 24e, and 24f. On the basis of the control by the control unit 30, the hand electrostatic adhesion units 24d, 24e, and 24f individually secure the fourth joint 14f, the fifth joint 14g, and the sixth joint 15 using electrostatic adhesion. It should be noted that the control unit 30 is capable of individually turning the electrostatic adhesion by the hand electrostatic adhesion units 24d, 24e, and 24f on and off.

Next, and operation performed by the robotic arm 10 will be described. In this non-limiting embodiment, as an example, an operation performed by the robotic arm 10 inside a household will be described.

Figure 8:
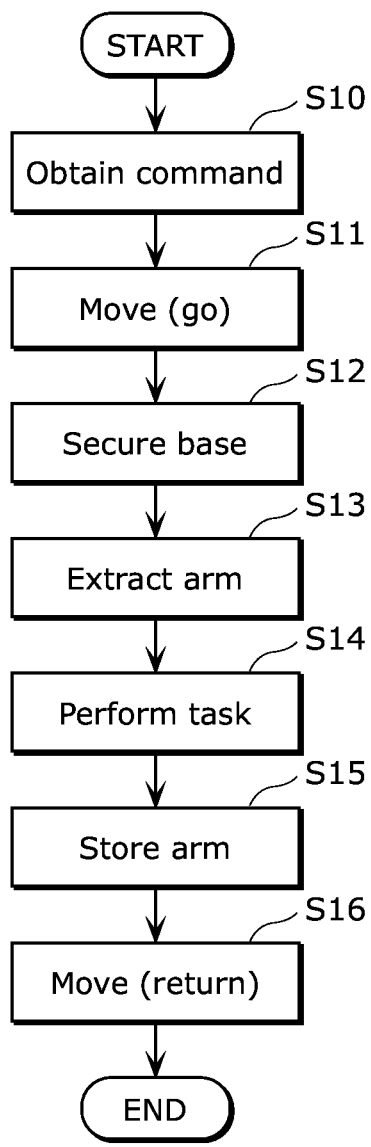
FIG. 8 is an operational flow chart of the robotic arm according to a non-limiting embodiment.

FIG. 8 is an operational flow chart of the robotic arm 10.

Figure 9:
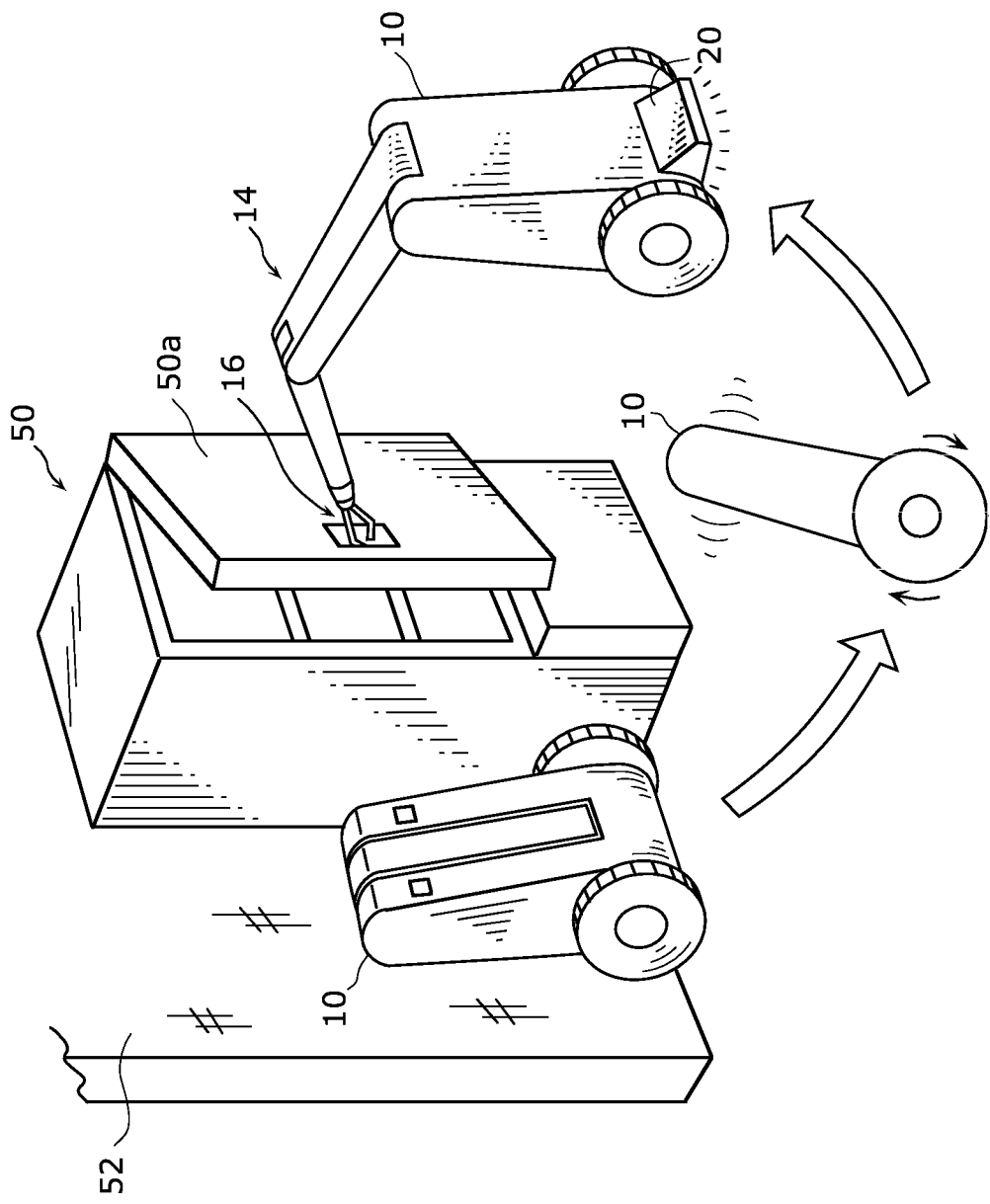
FIG. 9 is a view showing an operation performed by the robotic arm according to a non-limiting embodiment.

FIG. 9 is a view showing an operation performed by the robotic arm 10.

First, the robotic arm 10 obtains a command from the user (S10 in FIG. 8). More specifically, the robotic arm 10 obtains a command input by the user in the operating unit 38.

The robotic arm 10 according to the present disclosure is capable of performing a specific operation in accordance with an abstract command from the user. The user inputs into the operating unit 38, for example, a relatively vague command such as "I want to drink juice".

Next, the robotic arm 10 begins moving according to the command from the user (S11 in FIG. 8). More specifically, the robotic arm 10 moves, from a state in which it is set against a wall 52, as a result of the control unit 30 controlling the wheels 18. It should be noted that the robotic arm 10 captures images of the travel surface using the imaging unit 12b while moving, and travels while confirming whether the travel surface is flat or not. Moreover, while traveling, the robotic arm 10 measures a distance to an object in front of itself with the distance measuring unit 12c and confirms whether an obstacle is present or not based on the distance to the object.

The robotic arm 10 holds a control program in the ROM 30b of the control unit 30. In the control program, for example, commands related to food and drink such as "I want to drink (blank)" and "I want to eat (blank)" are associated with an operation such as "move to the refrigerator, open the refrigerator door, retrieve an object, move to the location of the user".

Moreover, the robotic arm 10 holds, in the RAM 30c in the control unit 30, position information in which the positions of furniture and household electronics are mapped.

As such, when the command "I want to drink juice" is made, this position information is referred to, and, based on the above-described program, the robotic arm 10 moves to the refrigerator 50 inside the household, as FIG. 9 shows.

Next, the robotic arm 10 adheres the electrostatic adhesion unit 24 to the floor in front of the refrigerator 50 to secure the base 12 in place (S12 in FIG. 8).

More specifically, first, the control unit 30 recognizes the handle of the refrigerator 50 using an image of the refrigerator 50 captured by the imaging unit 12b. Pre-existing image recognition techniques are used to recognize the handle.

Next, the control unit 30 measures the distance to the handle of the refrigerator 50 from the robotic arm 10 using the distance measuring unit 12c and, taking into consideration the length of the arm 14 and such, calculates an optimal position for grasping the handle of the refrigerator 50 and opening the door 50a.

The control unit 30 then controls the lever 22 to lower the base securing unit 20 onto the surface of the floor in an optimal position for opening and closing the refrigerator 50. The control unit 30 secures the base 12 in place by adhering the electrostatic adhesion unit 24 to the floor. At this time, since the robotic arm 10 is secured to the surface of the floor, the control unit 30 stops the driving units 42f and 42g which rotate the wheels 18 in order to prevent the robotic arm 10 from moving or falling over. This makes it possible reduce the power consumption of the robotic arm 10.

Next, the robotic arm 10 extracts the arm 14 (S13 in FIG. 8). More specifically, the control unit 30 extracts the arm 14 by controlling the first joint 14c and second joint 14d.

Next, the robotic arm 10 performs a task instructed by the user (S14 in FIG. 8). More specifically, the control unit 30 first controls the first through fifth joints so that the hand 16 (the long finger 16a and the short finger 16b) grasps the handle of the refrigerator 50 and opens the door 50a.

The control unit 30 then recognizes a can of juice from an image captured by the imaging unit 12b of the content of the refrigerator 50. At this time, the color and design of the can of the juice is held in advance in the RAM 30c, and the can of juice is recognized using image recognition techniques.

It should be noted that at this time, the control unit 30 may, for example, display the content of the refrigerator captured by the imaging unit 12b on the user's operating unit 38 and request the user to indicate a drink to be taken out of the refrigerator.

After the control unit 30 has recognized the can of juice, the robotic arm 10 controls the first joint 14c though the fifth joint 14g with the control unit 30, and grasps the can of juice with the hand 16. At this time, when the robotic arm 10 has difficulty grasping the can of juice from its current secured position, the control unit 30 temporarily releases the adhesion of the electrostatic adhesion unit 24, moves the robotic arm 10 to an optimal position, re-adheres the electrostatic adhesion unit 24, then performs the controlling for grasping the can of juice.

After the control unit 30 causes the hand 16 to grasp the can of juice, the robotic arm 10 moves to the position of the user. More specifically, the control unit 30 first releases the adhesion of the electrostatic adhesion unit 24. The control unit 30 then controls the lever 22 to store the base securing unit 20. Next, the robotic arm 10 moves as a result of the control unit 30 controlling the wheels 18.

At this time, the position of the user is detected using wireless communication as described above to detect the position of the operating unit 38. It should be noted that, for example, the position of the user may be detected and temporarily stored in the RAM 30c by the control unit 30 upon obtaining a command from the user in S10 in FIG. 8. Moreover, by the user reporting in advance by voice command what piece of furniture or home electronic device he or she is near, the control unit 30 may obtain the position of the user by referring to the position information held in the RAM 30c in which the positions of furniture and household electronics are mapped.

The arm 14 remains in its extracted state while the robotic arm 10 travels to the position of the user. During this time, there are instances in which the control unit 30 has difficulty controlling the wheels 18 and balancing the weight of the base 12 and the arm 14. In these instances, the control unit 30 temporarily controls the base securing unit 20 to secure the base 12, then controls the first joint 14c through fifth joint 14g to bring in the arm 14 so that balance is easier to maintain.

Next, after the robotic arm 10 travels to the position of the user and hands over the can of juice, the robotic arm 10 stores the arm 14 (S15 in FIG. 8). More specifically, the control unit 30 stores the arm 14 by controlling the first joint 14c and second joint 14d after first securing the base 12 in place by controlling the base securing unit 20.

Lastly, the robotic arm 10 returns to its original location (S16 in FIG. 8). More specifically, the robotic arm 10 returns to its original location as result of the control unit 30 controlling the wheels 18 after freeing the base securing unit 20 and the base 12. The original location refers to the state in which the robotic arm 10 is set against the wall 52 as shown in FIG. 9. At this time, the robotic arm 10 may close the refrigerator before returning to its original location.

It should be noted that the robotic arm 10 confirms whether the travel surface is flat or not by analyzing the images obtained by the imaging unit 12b throughout the traveling described above.

When the robotic arm 10 confirms that the travel surface is not flat from the images captured by the imaging unit 12b, the robotic arm 10 further determines whether an obstacle is present on the travel surface or not.

When the robotic arm 10 determines that an obstacle is present from the images captured by the imaging unit 12b, the robotic arm 10 further removes the obstacle using the arm 14 and the hand 16.

Next, an operation of securing the arm 14 of the robotic arm 10 will be described.

Figure 10:
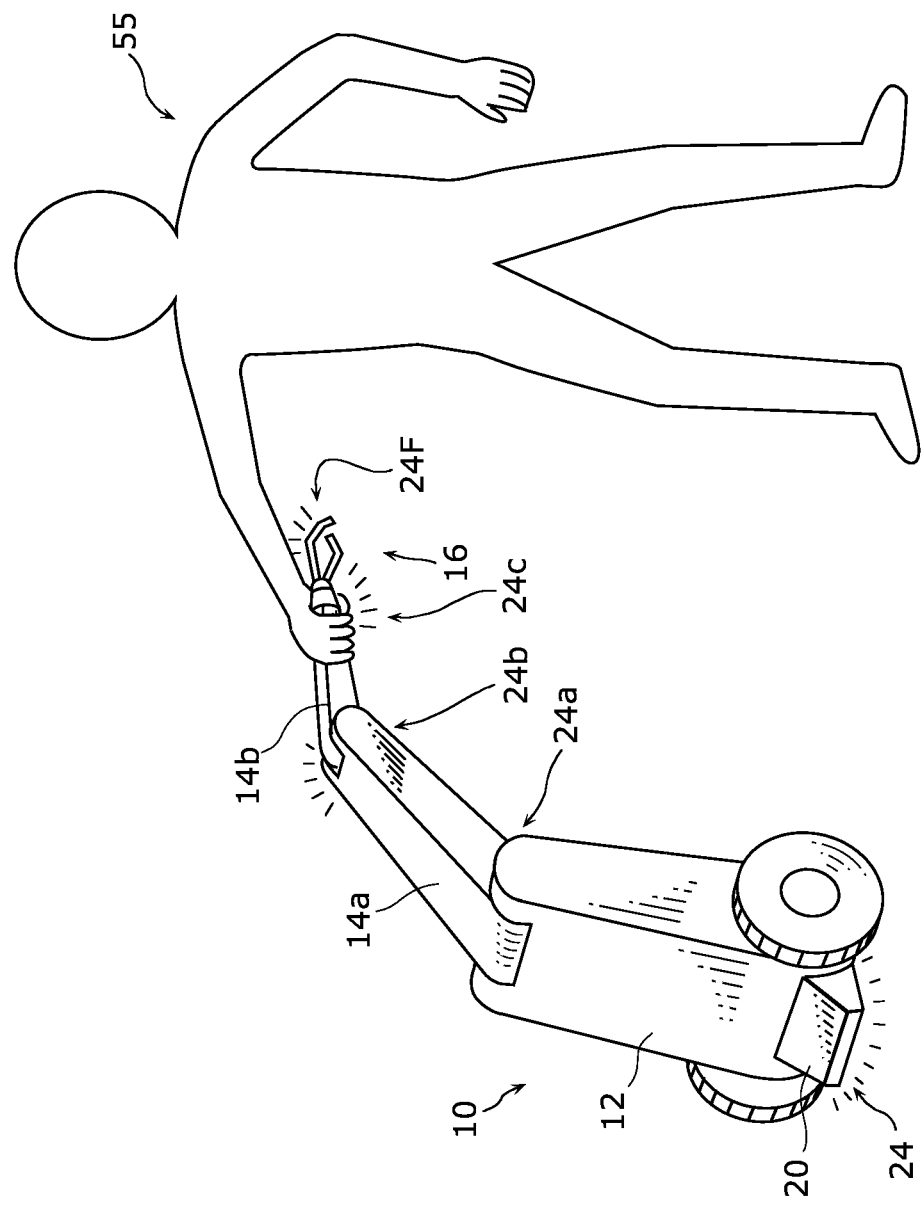
FIG. 10 is a view showing an arm securing operation performed by the robotic arm.

FIG. 10 is a view showing an arm securing operation performed by the robotic arm 10.

As FIG. 10 shows, by the robotic arm 10 securing the base 12 to the surface of the floor and securing the joints of the arm 14, the user 55 is capable of using the robotic arm 10 to assist in standing up. In other words, in order to assist the user 55 in standing up from sitting on the ground or in a chair, or getting out of bed, the robotic arm 10 can freely adjust its form or height as needed on a case by case basis to provide a function similar to a cane.

In instances like that shown in FIG. 10, the robotic arm 10 first obtains a command from the user 55 to secure the base 12 and the arm 14 in place. More specifically, the robotic arm 10 obtains a command input by the user 55 with the operating unit 38.

Next, after moving to the proximity of the user 55, the robotic arm 10 secures the base 12 to the surface of the floor. More specifically, the control unit 30 controls the lever 22 to lower the base securing unit 20 to the surface of the floor. The control unit 30 then secures the base 12 in place by adhering the electrostatic adhesion unit 24 to the floor. At this time, since the robotic arm 10 is secured to the surface of the floor, the control unit 30 stops the driving units 42f and 42g which rotate the wheels 18 in order to prevent the robotic arm 10 from moving or falling over. This also allows for power consumption to be reduced.

Next, the robotic arm 10 extracts the arm 14. More specifically, the control unit 30 extracts the arm 14 by controlling the first joint 14c and second joint 14d.

Next, the robotic arm 10 secures the arm 14 by electrostatic adhesion. More specifically, the control unit 30 controls the arm securing unit 23b to secure, with the arm electrostatic adhesion unit 24a, the base 12 and the upper arm 14a coupled by the first joint 14c. At this time, power is not supplied from the driving unit 42a to the motor 44a. In other words, the control unit 30 turns the motor 44a off.

Moreover, the control unit 30 controls the arm securing unit 23b to secure, with the arm electrostatic adhesion unit 24b, the upper arm 14a and the forearm 14b coupled by the second joint 14d. At this time, power is not supplied from the driving unit 42b to the motor 44b. In other words, the control unit 30 turns the motor 44b off.

Furthermore, the control unit 30 controls the arm securing unit 23b to secure, with the arm electrostatic adhesion unit 24c, the upper arm 14a and the hand 16 coupled by the third joint 14e. At this time, power is not supplied from the driving unit 42c to the motor 44c. In other words, the control unit 30 turns the motor 44c off.

With this, since the robotic arm 10 secures the base 12 to the surface of the floor and secures the joints of the arm 14, the user 55 can use the robotic arm 10 to assist in standing up.

Moreover, the control unit 30 may turn the motors 44a through 44c off while the arm is secured and supply power to the arm electrostatic adhesion units 24a through 24c for electrostatic adhesion. With this, a low power consumption robotic arm 10 can be achieved.

It should be noted that the robotic arm 10 may use the imaging unit 12b to determine the securing position of the arm 14.

Next, an example of how the robotic arm 10 determines the height to secure the arm 14 at using the imaging unit 12b will be described.

In this case, the robotic arm 10 first confirms the position of the user 55 from an image captured by the imaging unit 12b. Image recognition techniques such as facial recognition are used to recognize the user 55. At this time, for example, the robotic arm 10 calculates the height of the waist of the user 55, which is a height at which the user 55 can easily grab the arm 14. The robotic arm 10 may directly calculate the height of the user's waist using the above-described image recognition techniques. The robot arm 10 may also use facial recognition techniques and determine the height of the user's waist to be a predetermined height based on the height of the user's face (head) (in other words, approximately the user's height).

Lastly, the robotic arm 10 secures the arm 14 at the calculated height of the waist of the user 55.

Moreover, for example, the robotic arm 10 may measure the distance to the user 55 using the distance measuring unit 12c and determine the position to secure the arm 14 in.

Moreover, for example, the securing position of the arm 14 may be determined according to a voice command given by the user.

More specifically, for example, command words such as "chest" or "waist" given by the user are associated in advance in the control program with heights at which to secure the arm 14. The robotic arm 10 then obtains speech commands made by the user 55 via a speech obtaining unit (not shown in FIG. 7) provided in the operating unit 38 or the robotic arm 10, and determines the height to secure the arm 14 at according to the command words spoken by the user analyzed using voice recognition techniques.

Moreover, the robotic arm 10, using similar techniques, is capable of adjusting the height of the arm 14 according to voice commands given by the user 55 such as "up" and "down".

With this, the robotic arm 10 can secure the arm 14 in a position that is easy for the user 55 to grab using the imaging unit 12b, the distance measuring unit 12c, or the speech obtaining unit.

It should be noted that in the case shown in FIG. 10, the robotic arm may further secure the hand 16.

More specifically, the control unit 30 may control the hand securing unit 23c to secure, with the hand electrostatic adhesion unit 24d, the hand 16 and the long finger 16a coupled via the fourth joint 14f. At this time, power is not supplied from the driving unit 42d to the motor 44d. In other words, the control unit 30 turns the motor 44d off.

Moreover, the control unit 30 may control the hand securing unit 23c to secure, with the hand electrostatic adhesion unit 24e, the hand 16 and the short finger 16b coupled via the fifth joint 14g. At this time, power is not supplied from the driving unit 42e to the motor 44e. In other words, the control unit 30 turns the motor 44e off.

Moreover, the control unit 30 may control the hand securing unit 23c to secure, with the hand electrostatic adhesion unit 24f, the leading end part of the long finger 16a and the non-leading end part of the long finger 16a nearest the hand coupled via the sixth joint 15. At this time, power is not supplied from the driving unit 42i to the motor 44i. In other words, the control unit 30 turns the motor 44i off.

With this, the control unit 30 may turn the motors 44d, 44e, and 44i off while the hand is secured and supply power to the hand electrostatic adhesion units 24d through 24f for electrostatic adhesion. With this, a low power consumption robotic arm 10 can be achieved.

Moreover, the robotic arm 10 is capable of providing the user 55 with walking assistance by traveling while the joints of the arm 14 are secured in place.

Figure 11:
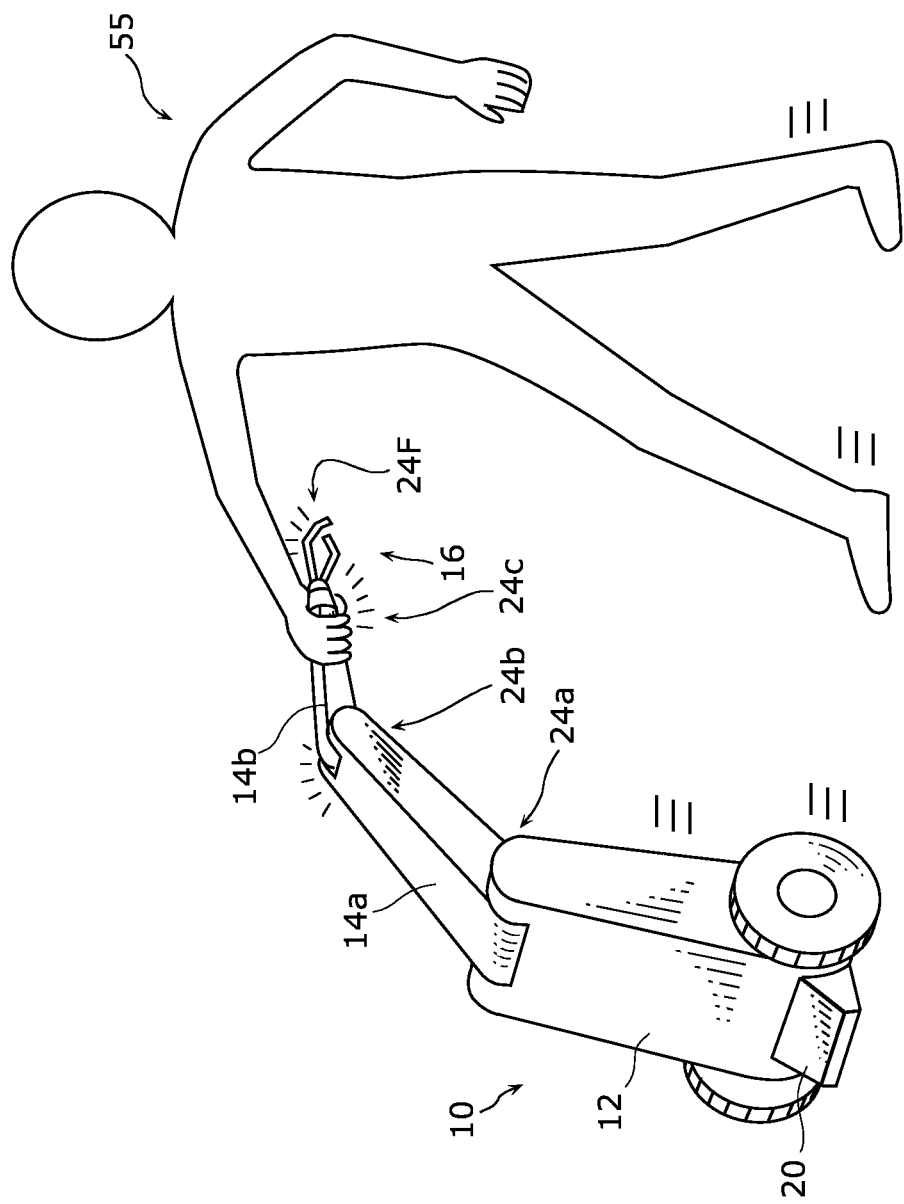
FIG. 11 is a view showing a walking assistance operation performed by the robotic arm.

FIG. 11 is a view showing a walking assistance operation performed by the robotic arm 10.

When providing the user 55 with walking assistance, the robotic arm 10 releases the securing of the base 12 and keeps the joints of the arm 14 secured in place (as is shown in FIG. 10). More specifically, the control unit 30 controls the lever 22 to store the base securing unit 20 after releasing the electrostatic adhesion by the electrostatic adhesion unit 24.

Next, the robotic arm 10 provides the user 55 with walking assistance (leads the user 55) by rotating the wheels 18. More specifically, the balance measuring unit 37 measures changes in weight balance as a result of the user 55 adding weight to the secured arm 14. More specifically, the control unit 30 controls the weight balance of the robotic arm 10 by individually controlling the rotational speed and rotational direction of the right wheel 18a and the left wheel 18b based on the changes in weight balance of the robotic arm 10 measured by the balance measuring unit 37.

With this, the robotic arm 10 is capable of matching the walking speed of the user 55 while supporting the weight of the user 55 by the control unit 30 controlling the wheels 18 according to the weight the user 55 adds to the arm 14.

It should be noted that while providing walking assistance, the robotic arm 10 may use the imaging unit 12b, the distance measuring unit 12c, or the voice obtaining unit to adjust the traveling speed and/or position of the arm 14 based on commands from the user 55.

It should be noted that in this non-limiting embodiment, although it is described that the arm securing unit 23b and the hand securing unit 23c each secure the positional relationship between two parts coupled by a joint by electrostatically adhering the two parts together, the joints may be secured by limiting the movement of the joints themselves. In other words, two parts coupled by a joint are not required to be electrostatically adhered together.

For example, the positional relationship of two parts coupled by a joint may be secured indirectly by electrostatic adhesion, without directly electrostatically adhering the two parts.

Figure 12:
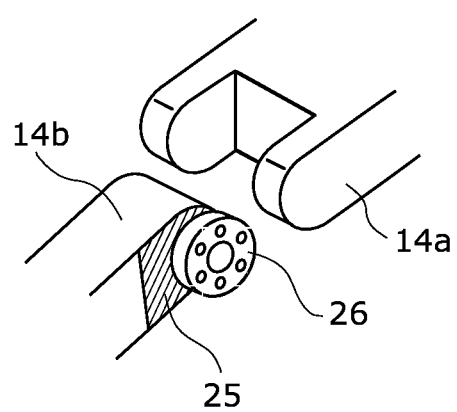
FIG. 12 is a view showing the structure of a joint when the joints of the arm are configured to be secured indirectly.

FIG. 12 is a view showing the structure of a joint on the arm 14 when the positional relationship of two parts are configured to be secured indirectly by electrostatic adhesion. FIG. 12 shows the structure of the second joint 14d as an example.

A servo horn 26 is a circular part mechanically attached (secured) to the upper arm 14a. Moreover, a rotary shaft provided on the forearm 14b is mechanically attached to an opening provided on the servo horn 26 and rotated by the motor 44b shown in FIG. 7.

With this, the control unit 30 controls the bending of the arm 14 at the second joint 14d by driving the motor 44b.

The surface of the servo horn 26 is proximal to the contact surface of the upper arm 14a on the forearm 14b. An arm electrostatic adhesion unit 25 is provided, as the arm securing unit 23b, on the forearm 14b at the contact surface with the upper arm 14a.

With this, the arm securing unit 23b is capable of, on the basis of the control by the control unit 30, securing the forearm 14b and the servo horn 26 with the arm electrostatic adhesion unit 25. As such, the forearm 14b and the upper arm 14a are indirectly secured by electrostatic adhesion. In other words, the arm securing unit 23b secures, by electrostatic adhesion, the positional relationship of two parts (the forearm 14b and the upper arm 14a) coupled by a joint.

In this way, indirectly securing the positional relationship of two parts coupled by a joint by electrostatic adhesion is included in the present disclosure.

It should be noted that the example above described securing the second joint 14d indirectly, but this may be applied to any other joint provided on the arm 14.

Moreover, the joints provided on the hand 16 may also be secured indirectly. In other words, the hand securing unit 23c secures, by electrostatic adhesion, the positional relationship of two parts coupled by a joint.

It should be noted that in this non-limiting embodiment, the base 12 and the arm 14 are described as two separate parts, but the combination of the base 12 and the arm 14 may be considered a single arm. In this case, the base 12 is an arm unit configured of a single arm, and the base securing unit 20 is the arm securing unit 23b provided at a joint on the arm 14.

Moreover, in this non-limiting embodiment, the base securing unit 20 is retractable and only extracted when the base 12 needs to be secured to the travel surface by adhesion via the electrostatic adhesion unit 24. However, the control method of the base securing unit 20 is not limited to this example. For example, the distance between the base securing unit 20 and the travel surface may be controlled by vertically adjusting the wheels 18, rather than controlling the base securing unit 20.

Figure 13:
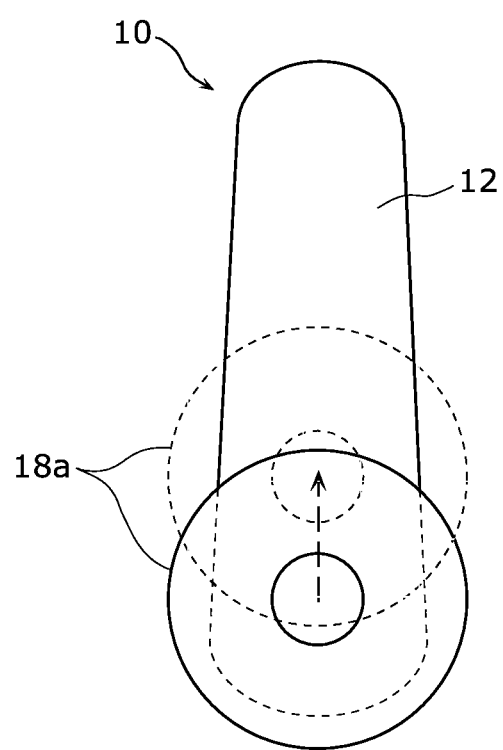
FIG. 13 is a view showing vertical adjustment of the wheels to control the base securing unit.
Figure 14:
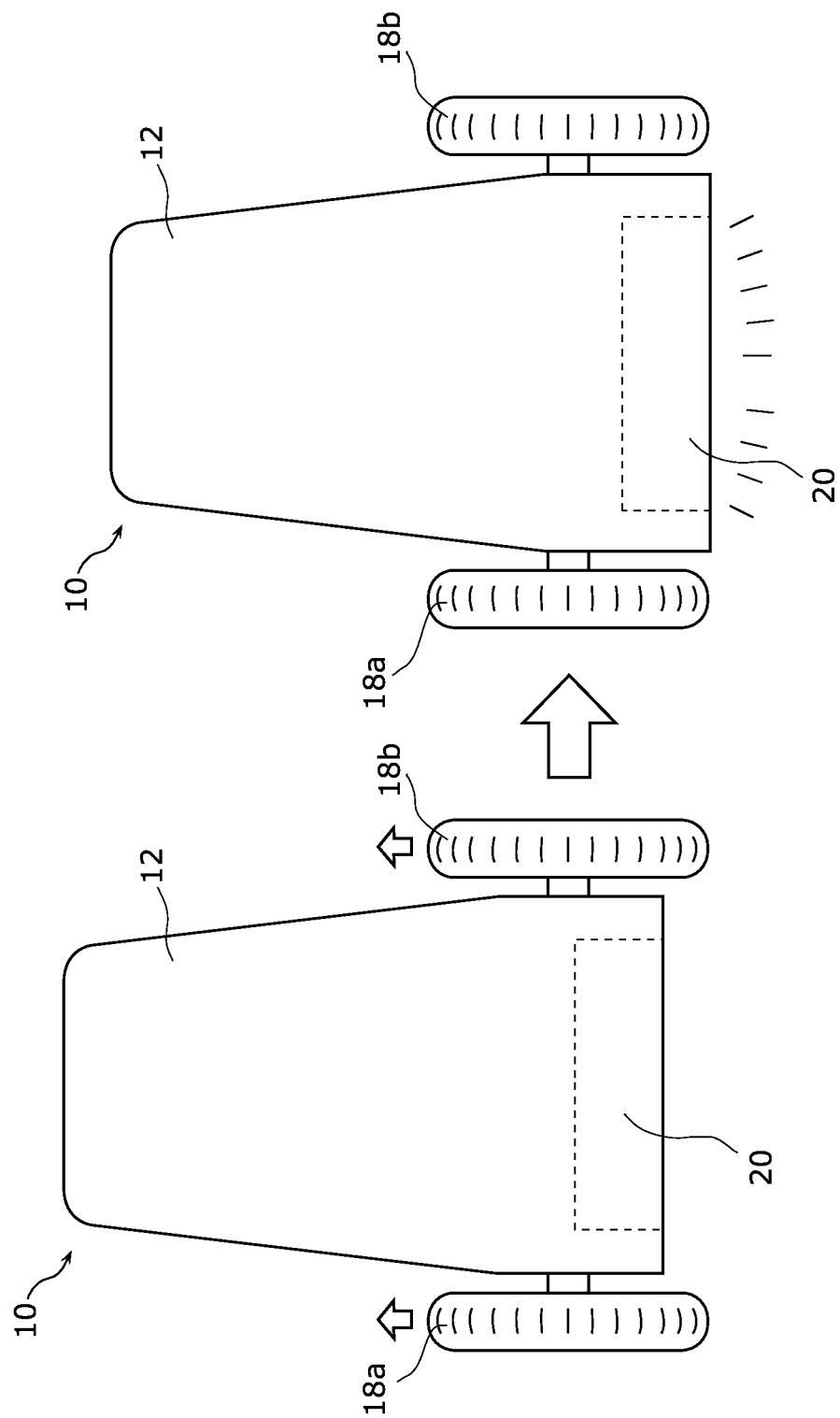
FIG. 14 is a different view showing vertical adjustment of the wheels to control the base securing unit.

FIG. 13 and FIG. 14 are views showing vertical adjustment of the wheels 18 to control the base securing unit 20.

FIG. 13 is a view showing the right side of the robotic arm 10, and FIG. 14 is a view showing the robotic arm 10 from the front and back.

In the views shown in FIG. 13 and FIG. 14, the base securing unit 20 is positioned on the bottom of the base 12 so that the electrostatic adhesion unit 24 is fixed in place to face the travel surface. On the other hand, the wheels 18 are vertically adjustable along the base 12.

As the left view in FIG. 14 shows, when the vertically adjustable wheels 18 are set in the lower end position on the base 12, the base securing unit 20 is separated from the travel surface. In other words, in this state, the robotic arm 10 is capable of rotating the wheels 18 and traveling.

When the vertically adjustable wheels 18 are set in the upper end position on the base 12, the base securing unit 20 is in contact with the travel surface. In other words, in this state, the electrostatic adhesion unit 24 is capable of electrostatically adhering to the travel surface and securing the base 12 in place.

It should be noted that in this non-limiting embodiment, the base securing unit 20 is provided on a bottom that is a portion of the base 12 nearest the travel surface 12, but the position of the base securing unit 20 is not limited to this position. For example, the base securing unit 20 may be provided on a side surface of the base 12 (a surface on which at least one of the wheel 18s is attached). It should be noted that the robotic arm 10 may be provided with a plurality of base securing units 20.

Figure 15:
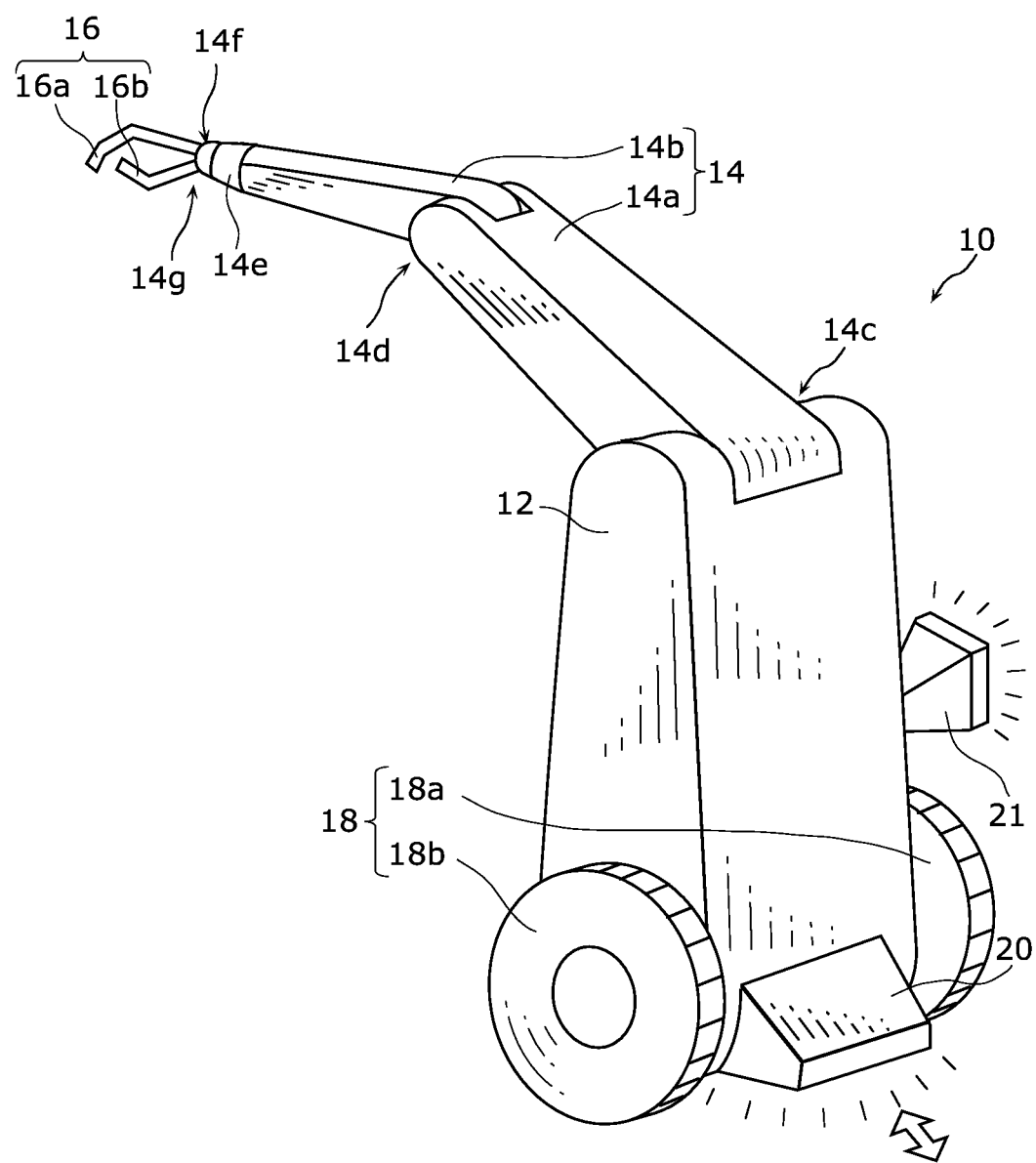
FIG. 15 is a view showing an example of the robotic arm provided with a base securing unit on a side of the base.

FIG. 15 is a view showing an example of the robotic arm provided with a base securing unit 21 on a side surface of the base 12, in addition to the base securing unit 20.

As FIG. 15 shows, the base 12 can be even more strongly secured in place by electrostatically adhering the electrostatic adhesion unit 24 of the base securing unit 20 provided on the bottom of the base 12 to the travel surface and electrostatically adhering the electrostatic adhesion unit of the base securing unit 20 provided on a side surface of the base 12 to the surface of a wall. Here, a side surface of the base 12 is a surface among the surfaces of the base 12 that are not parallel to the travel surface. In this non-limiting embodiment, the side surface include the surfaces of the base 12 on which the wheels 18 are provided, the surfaces on which the imaging unit 12b and the distance measuring unit 12c are implemented, and the surface on which the base securing unit 20 is provided.

Moreover, when an object installed inside the building is, for example, an object that is heavy such as a refrigerator (generally, the weight of a 500 liter capacity refrigerator is roughly 80 kg or more), the object is considered to be secured to the surface of the floor, which means the base 12 can be secured to any surface of the refrigerator besides the door and the door can be opened and closed.

This concludes the description of the robotic arm 10 according to this non-limiting embodiment. With the present disclosure, a robotic arm is achievable that has an arm capable of securing joints provided thereon in place with low power consumption and is capable of assisting a user in standing and sitting.

It should be noted that in the above non-limiting embodiment, the robotic arm 10 is described as being provided with the wheels 18, but the robotic arm may be provided with legs instead of the wheels 18.

Figure 16:
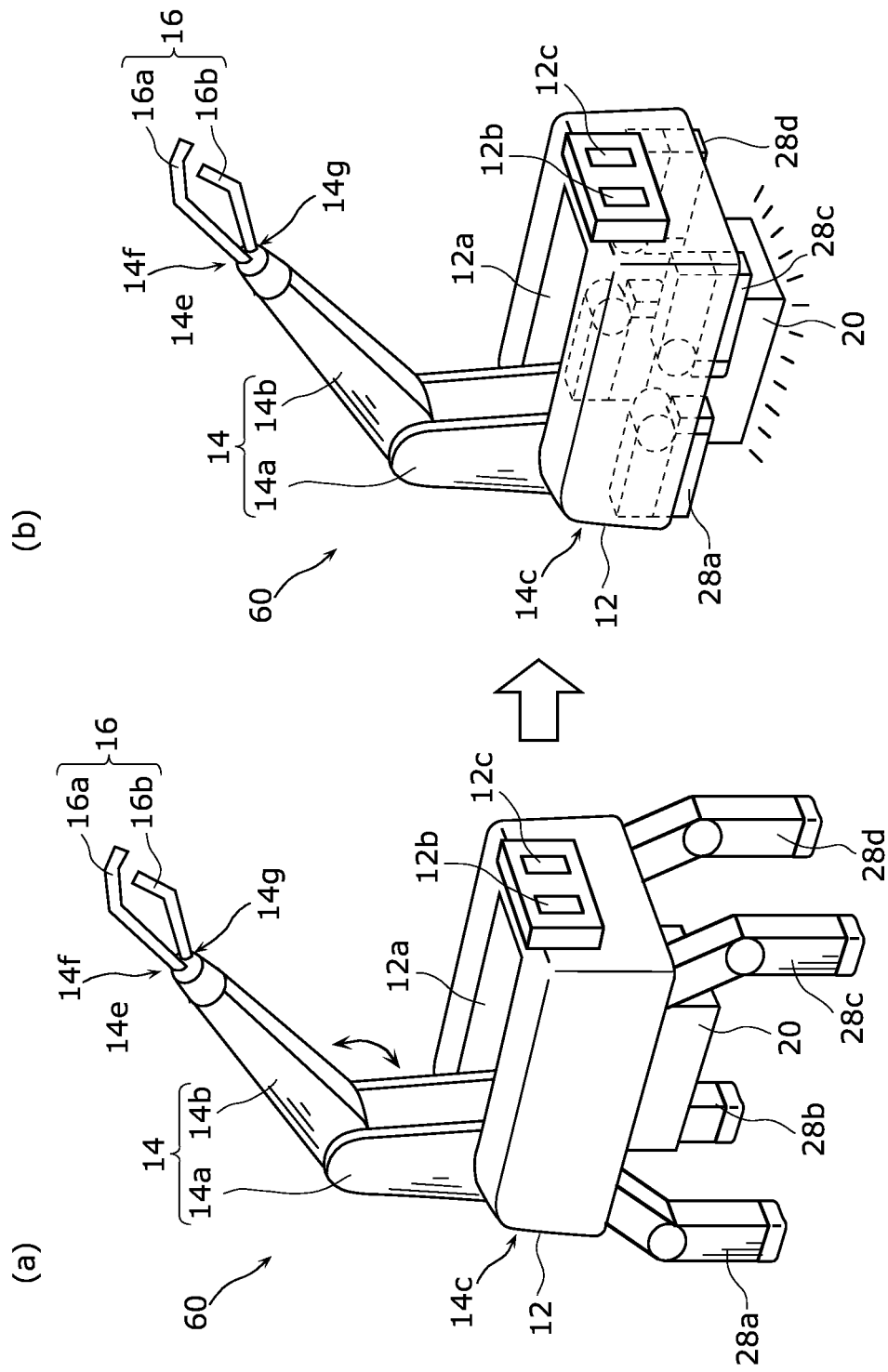
FIG. 16 is an external view of the robotic arm provided with legs.

FIG. 16 is an external view of the robotic arm provided with legs.

As (a) in FIG. 16 shows, a robotic arm 60 is provided with and travels (walks) on the travel surface with four legs 28a through 28d.

Moreover, as (b) in FIG. 16 shows, the robotic arm 60 is capable of storing the folded up legs 28a through 28d in the base 12. With this, the robotic arm 60 is capable of electrostatically adhering the electrostatic adhesion unit of the base securing unit 20 to the travel surface. It should be noted that the base securing unit 20 may be provided on the surfaces of the legs 28a through 28d that come in contact with the travel surface (in other words, the bottom portions of the feet).

As the above, the non-limiting embodiment has been described by way of example of the technology of the present disclosure. To this extent, the accompanying drawings and detailed description are provided.

Thus, the components set forth in the accompanying drawings and detailed description include not only components essential to solve the problems but also components unnecessary to solve the problems for the purpose of illustrating the above non-limiting embodiment. Thus, those unnecessary components should not be deemed essential due to the mere fact that they are described in the accompanying drawings and the detailed description.

The above non-limiting embodiment illustrates the technology of the present disclosure, and thus various modifications, permutations, additions and omissions are possible in the scope of the appended claims and the equivalents thereof.

INDUSTRIAL APPLICABILITY

The robotic arm according to the present disclosure includes an arm capable of securing joints provided thereon in place with low power consumption and is applicable as an assistance and health care robot designed for household use, for example.

The invention claimed is:

1. A robotic arm comprising:
an arm having one or more joints;
an arm securing unit that is provided on at least one of the one or more joints and provided on one of two parts coupled by the at least one of the one or more joints, the arm securing unit being configured to secure, by electrostatic adhesion, a positional relationship between the two parts; and
a control circuit configured to supply a signal to the arm securing unit to allow or prevent movement of the at least one of the one or more joints.

2. The robotic arm according to claim 1,
wherein the arm securing unit is configured to electrostatically adhere together the two parts coupled by each of the at least one of the one or more joints of the arm, to secure the positional relationship between the two parts.

3. The robotic arm according to claim 1,
wherein each of the one or more joints of the arm is provided with the arm securing unit.

4. The robotic arm according to claim 1, further comprising:
a hand having one or more joints and coupled to the arm by at least one of the one or more joints of the arm, the hand being for grasping an object; and
a hand securing unit that is provided on at least one of the one or more joints of the hand and provided on one of two hand parts coupled by the at least one of the one or more joints, the hand securing unit being configured to secure, by electrostatic adhesion, a positional relationship between the two hand parts,
wherein the control circuit is further configured to supply a signal to the hand securing unit to allow or prevent movement of the at least one of the one or more joints of the hand.

5. The robotic arm according to claim 4,
wherein the hand securing unit is configured to electrostatically adhere together the two hand parts coupled by each of the at least one of the one or more joints of the hand, to secure the positional relationship between the two hand parts.

6. The robotic arm according to claim 1, further comprising a base coupled to the arm by at least one of the one or more joints of the arm.

7. The robotic arm according to claim 6, further comprising a base securing unit that is attached to the base and configured to secure the base in place by electrostatic adhesion to a surface of a structure external to the robotic arm,
wherein the control circuit is further configured to supply a signal to the base securing unit to control electrostatic adhesion to the surface of the structure.

8. The robotic arm according to claim 6,
wherein the base includes a storage space for storing the arm.

9. The robotic arm according to claim 1, wherein the arm securing unit has a sheet-like structure.

10. The robotic arm according to claim 4, wherein the hand securing unit has a sheet-like structure.

11. The robotic arm according to claim 6, wherein the base securing unit has a sheet-like structure.

12. A robotic arm comprising:
an arm having a joint that pivotally or rotatably connects two arm parts;
an arm securing device that is provided on at least one of the two arm parts, the arm securing device being configured to prevent pivotal or rotational movement of the join by securing, by electrostatic adhesion, positional relationship between the two arm parts and to allow the pivotal or rotational movement of the joint; and
a control circuit configured to supply a signal, responsive to a user input, to the arm securing unit to allow or prevent the pivotal or rotational movement of the joint.

13. The robotic arm according to claim 12, wherein the arm is provided with plural joints, each of the plural joints including the arm securing device.

14. The robotic arm according to claim 13, further comprising a base coupled to the arm by one of the joints of the arm.

15. The robotic arm according to claim 14, wherein the base includes a storage space for storing the arm.

16. The robotic arm according to claim 14, further comprising a base securing unit attached to the base and configured to secure the base in place by electrostatic adhesion to a surface of a structure external to the robotic arm,
wherein the control circuit is further configured to supply a signal to the base securing unit to adhere to the surface of the structure or to detach from the surface of the structure.

17. The robotic arm according to claim 16, wherein the base securing unit is retractable into the base.

* * * * *